United States Patent [19]

Beretta

[11] Patent Number: 4,470,942
[45] Date of Patent: Sep. 11, 1984

[54] PROCESS AND EQUIPMENT TO OBTAIN A PLATE PROVIDED WITH HOLES DIRECTLY BY EXTRUDING PLASTIC MATERIALS

[75] Inventor: Mario Beretta, Barzano', Italy
[73] Assignee: R.D.B. Plastotecnica S.p.A., Italy
[21] Appl. No.: 357,745
[22] Filed: Mar. 12, 1982

[30] Foreign Application Priority Data

Mar. 31, 1981 [IT] Italy .................. 20853 A/81

[51] Int. Cl.³ .................. B29C 24/00
[52] U.S. Cl. .................. 264/145; 264/151; 264/156; 264/167; 264/DIG. 81; 425/290; 425/311; 425/313; 425/316
[58] Field of Search .............. 264/145, 146, 151, 167, 264/156, DIG. 81; 425/290, 302.1, 304, 311, 313, 316

[56] References Cited

U.S. PATENT DOCUMENTS

| | | | |
|---|---|---|---|
| 3,160,687 | 12/1964 | Andrews | 425/290 |
| 3,329,998 | 7/1967 | Stöhr | 264/151 |
| 3,642,967 | 2/1972 | Doll | 264/156 |
| 3,714,310 | 1/1973 | Gaffney et al. | 264/167 |
| 3,841,815 | 10/1974 | Labarre | 425/311 |
| 3,947,174 | 3/1976 | Hureau et al. | 425/290 |
| 4,038,008 | 7/1977 | Larsen | 425/290 |
| 4,189,292 | 2/1980 | Hureau et al. | 425/290 |
| 4,303,609 | 12/1981 | Hureau et al. | 425/290 |

FOREIGN PATENT DOCUMENTS

| | | | |
|---|---|---|---|
| 2349213 | 5/1974 | Fed. Rep. of Germany | 425/290 |
| 2131842 | 11/1972 | France | 425/290 |
| 2138198 | 1/1973 | France | 264/167 |
| 2160270 | 6/1973 | France | 264/167 |

Primary Examiner—Jeffery R. Thurlow
Attorney, Agent, or Firm—Darby & Darby

[57] ABSTRACT

The invention relates to a process and an equipment to obtain a plate provided with holes directly by extruding plastic materials. The process consists in submitting the material coming out of an extruder head to expansion stresses according to more than one direction and in executing a plurality of perforations in said material submitted to expansion by means of perforating means; the equipment consists of a plurality of perforating devices provided with a reciprocating motion so that they can reach an interference position with respect to the material coming out of the extruder head and of means which, acting at the same time as the perforating devices, are suitable to produce an expansion of the extruded material.

6 Claims, 7 Drawing Figures

PROCESS AND EQUIPMENT TO OBTAIN A PLATE PROVIDED WITH HOLES DIRECTLY BY EXTRUDING PLASTIC MATERIALS

FIELD OF THE INVENTION

This invention relates to a process and an equipment to obtain a plate provided with holes directly by extruding plastic materials without causing any removal of scraps. The process and equipment in question are particularly applied to the field of the manufacture of extensible and adapted to deformation plastic materials in which, starting from the extrusion of plastic materials in the form of a continuous plate, it is possible to obtain a semifinished product characterized in that it is provided with differently disposed, shaped and sized holes.

BACKGROUND OF THE INVENTION

At present, the art in common use for obtaining such semifinished products requires that the continuous plate coming from the extrusion phase should be cooled and subsequently passed under punching machines which cut the material in order to create holes at previously stated positions. However this procedure involves some drawbacks which can affect both the cost and the quality of the product. In fact, a cold punching gives inevitably rise to the formation of an important quantity of scraps, above all when the holes have a bigger surface than the solid portions delimiting them, as in the case of trellis and the like. Furthermore, it is to be observed that the punching operation causes, at some predetermined points, an interruption or cutting of the fibers forming the structure of the plastic material. Obviously, the cutting of these fibers causes the structure of the finished product to be weakened, so that the latter can only be submitted, in use, to reduced tensile stresses, while it is desirable that the bearable stresses should be high both during the assembling and the use stages.

OBJECT

The object of the present invention is to obviate the above mentioned drawbacks by accomplishing a process and an equipment adapted to obtain a plate provided with holes directly by extruding plastic materials, said process and equipment enabling the obtention of differently holed and highly stout plate structures without any removal of scraps.

SUMMARY OF THE INVENTION

This and other objects which will become more evident from the description which follows are attained, according to the present invention, by a process to obtain a plate provided with holes directly by extruding plastic materials from an extruder head, characterized in that it consists in submitting the semifluid material coming out of the extruder head to expansion stresses according to at least two directions at right angles to one another, in executing a plurality of perforations in said material submitted to expansion, so that at predetermined points of the extruded material they cause a continuous withdrawal of the fibers which afterwards join together again, owing to the plasticity of the material, thereby giving rise to the formation in said plate of a plurality of differently shaped holes.

Advantageously and according to a further feature of the present invention, the equipment suitable for the achievement of the above mentioned process is characterized in that, in combination with an extruder head through which the material is continuously forced to come out, it comprises a plurality of perforating devices provided with a reciprocating motion from a position in which they do not interfere with the extruded material to a position in which they intercept said material and means which, acting at the same time as the perforating devices, are apt to produce an expansion of the extruded plastic material according to at least two directions at right angles to one another.

Further features and advantages of the invention will become more evident from the detailed description of two preferred but not exclusive embodiments of a process and an equipment to obtain a plate provided with holes directly by extruding plastic materials, given hereinafter, by way of example only, with reference to the accompanying drawings.

DESCRIPTION OF THE PREFERRED EMBODIMENTS

Figure 1:
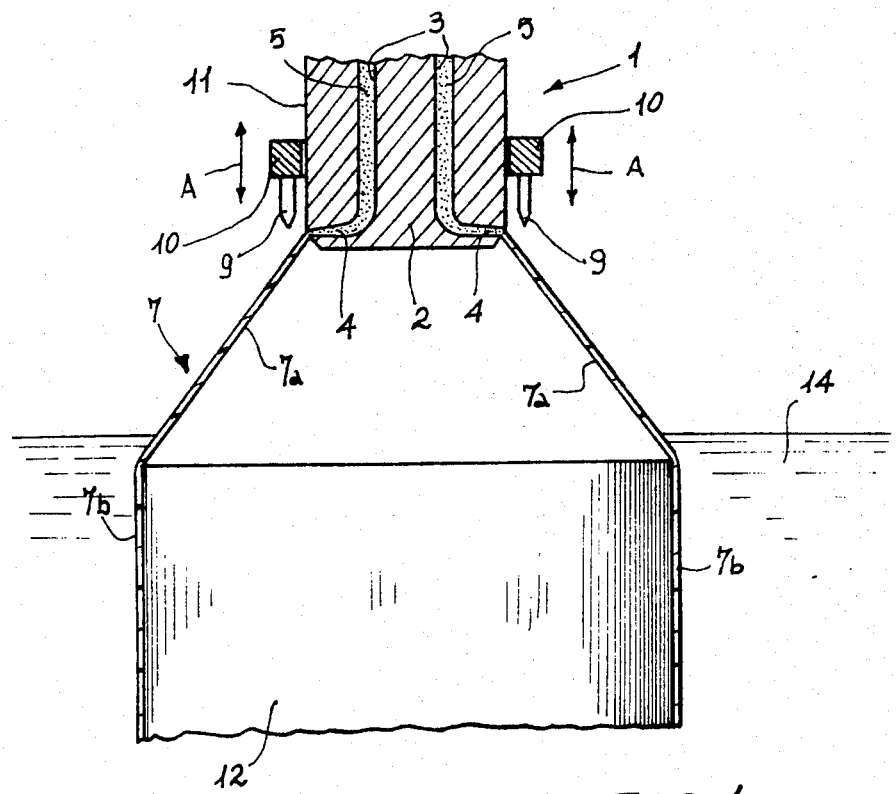
FIG. 1 is a cross-sectional diagrammatic view of an equipment to obtain a plate provided with holes without any removal of scraps.

Referring to the above mentioned figures, the process to obtain a holed plate directly from the extrusion of plastic materials according to the present invention involves the use of an extruder head generally indicated at 1. The extruder head can have a flat shape in order to obtain flat plates however, according to a preferred embodiment, it can be formed of a substantially cylindrical body 2 in which a coaxial annular canalisation 3 is provided, the latter opening on an annular spreading orifice.

The plastic material to be extruded, which at this stage is in a semifluid state, is passed through said canalisation 3 and orifice 4, by means of a known conventional procedure. This material, at the outlet of orifice 4, takes the shape of a tubular plate.

According to the present invention the process consists in submitting the plastic material 5, coming out of the extruder head 1, to stresses enabling its expansion according to at least two directions at right angles to one another. It is provided that during said so-called expansion stage a plurality of perforations are executed, according to the present invention, at predetermined points of the extruded and expanded material. As at this stage the material is not yet solidified but has a semifluid or pasty appearance, the above mentioned perforations give rise to a continuous withdrawal of the fibers, this action lasting till the devices which have caused said perforations are removed. Owing to the plasticity of the material, the removal of said devices causes the fibers to be joined together again according to a rounded shape, so that a plurality of differently shaped holes are obtained on the extruded tubular plate.

Figure 3:
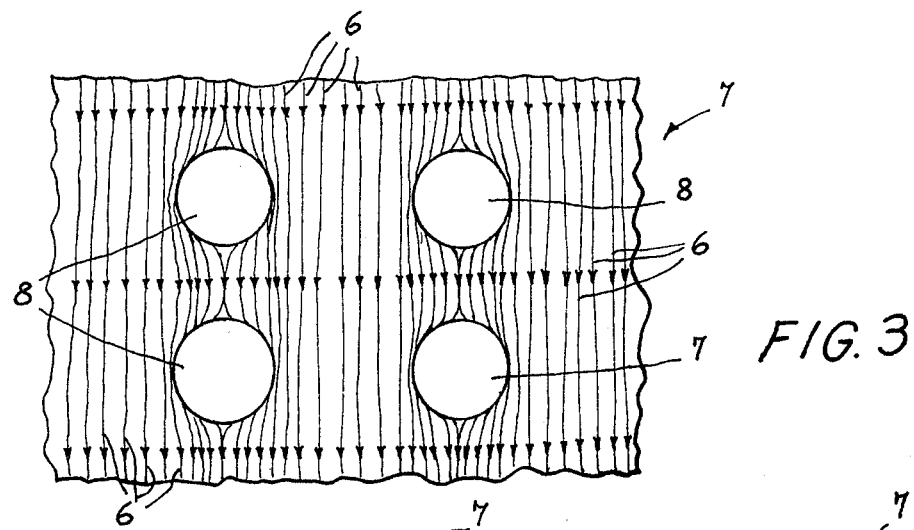
FIG. 3 is a view, to an enlarged scale, of the orientation taken by the fibers made of expansible plastic material when submitted to the perforation process according to the invention.

By way of example, the orientation of flow of the plastic fibers 6 when round holes have to be obtained in the extruded plate 7, is shown in FIG. 3.

Referring particularly to FIG. 1 of the drawings, the equipment designed to obtain the tubular plate 7 provided with holes comprises, according to said preferred embodiment, a plurality of perforating devices 9 disposed in a circle on a bearing ring 10 mounted coaxially to the extruder head 1, reciprocally movable along the outer circumferential edge 11 of the same head.

Figure 7:
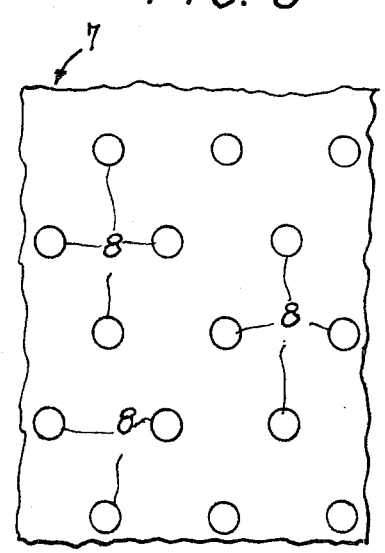

Furthermore, according to a further feature of the present invention, the bearing ring 10 is rotatably mounted on the extruder head 1, so that, when operated by suitable means not shown in the figures as already known by a person skilled in the art, can be rotated about the head 1 in order to obtain chequered, or in any case arranged in zigzag order, perforations 8, as shown in the example of FIG. 7.

In order to obtain the expansion stresses required by the process described above, the equipment according to the invention is provided with a calibrating mandrel 12, disposed coaxially to the extruder head 1, downstream of the latter with respect to the direction of flow of the extruded plastic material. The transverse sizes of the calibrating mandrel 12 are considerably bigger than the corresponding sizes of the extruder head 1.

When the extruder head has a flat shape, catching means should be provided; this means will catch the extruded material at least along two opposing sides thereof and move according to opposite directions so that an expansion of the same material can take place, while substantially linearly disposed perforating devices will carry out a series of perforations.

The plate 7, extruded in a tubular shape through the annular orifice 4, is slipped on the calibrating mandrel 12 which, owing to its transverse dimensions, causes the semifluid or pasty plastic material to be expanded. Thus the tubular plate 7 takes a toroidal shape on its first portion 7a before reaching its final shape as a semifinished product on the following portion 7b, where it is slipped on the calibrating mandrel 12 and skimmed by a coolant 14.

When, by means of known and conventional means, the lowering of the bearing ring 10 along the circumferential outer edge 11 of the extruder head 1 is operated according to the arrow A of FIG. 1, the roundly disposed perforating devices 9 are brought to two different positions in which they respectively interfere and do not interfere with the plate 7 of extruded material.

Figure 4:
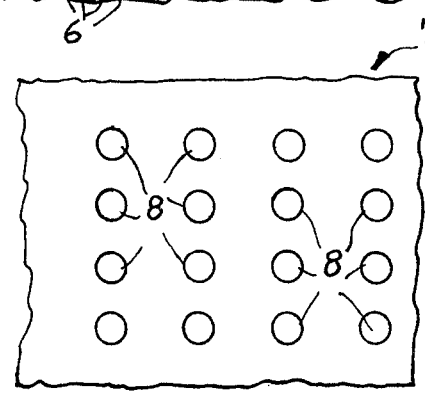
FIGS. 4 to 7 are diagrammatic views of the holed plates obtained by the process of the present invention.
Figure 5:
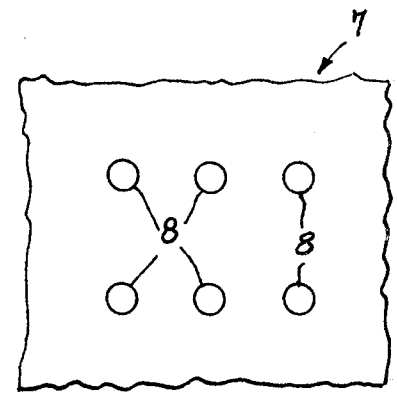

According to the space of time which passes between a series of perforations and the following one it is possible to obtain holed plates 7 having a greater or smaller number of perforations 8, as is shown by the examples of FIGS. 4 and 5 in which the space of time between one series of perforations and the following one is respectively short and long.

Figure 2:
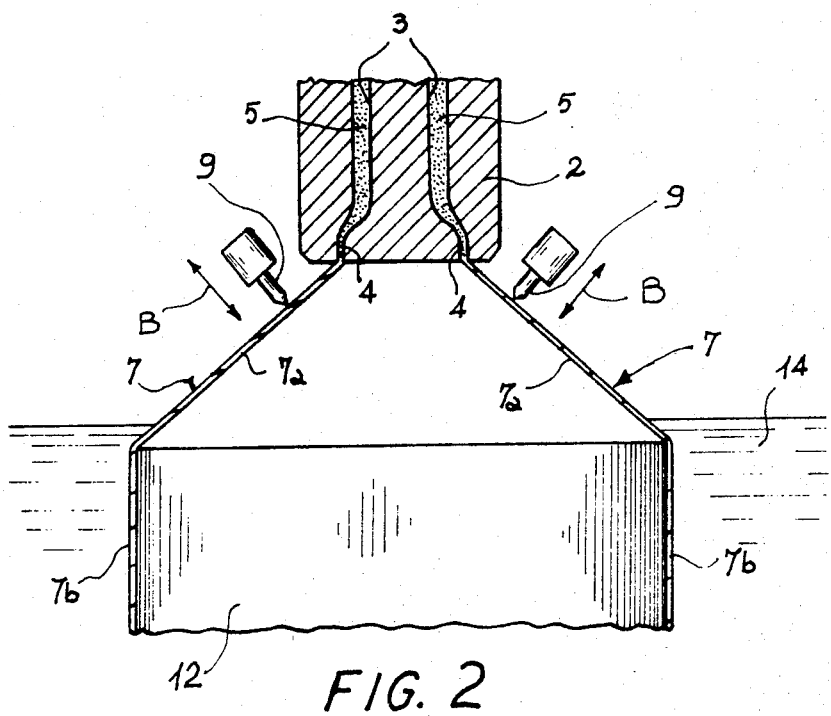
FIG. 2 shows an alternative construction of the equipment seen in FIG. 1.
Figure 6:
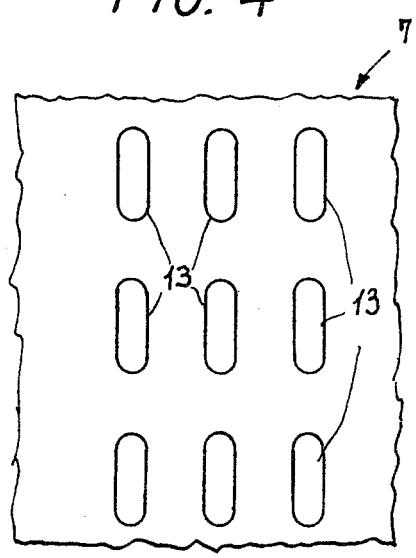

On the contrary, according to the space of time during which the perforating devices 9 are kept in an interference position with the plate 7 of extruded plastic material, the perforations obtained can be differently shaped. In particular, if the space of time during which said perforating devices 9 interfere with the plate 7 is relatively long, the perforations obtained have an elongated shape, similar to a loop, as clearly shown at 13 in the example of FIG. 6. We turn now to FIG. 2, where an alternative embodiment of the equipment according to the present invention is shown. According to this embodiment, the extruder head 1 is different from the above described one in that the annular canalisation 3 opens on an annular spreading orifice 4 which, instead of being disposed on the circumferential edge 11 of the same head 1, keeps coaxial to the canalisation 3 though its diametrical lying is bigger than the corresponding lying of the above mentioned canalisation 3. Furthermore, as clearly shown in the diagrammatic example of FIG. 2, though the perforating devices 9 keep a round arrangement and are provided with a reciprocating motion according to the direction of the arrow B, they are mounted so that their axes are always at right angles to the portion 7a of plate 7 where said plate takes a toroidal conformation.

However, it is to be noted that both the arrangement in a circle and the inclination of the perforating devices 9 with respect to the plate 7 of extruded material are not intended in a limiting sense. In fact, the perforating devices 9 can take any other arrangement and inclination with respect to the plate 7 outside or inside the same, provided that such arrangement and inclination are restricted to the portion 7a while submitted to expansion.

As already observed, the holed plate 7 obtained from the above process and equipment is not a finished product, but a semifinished one which will later be used to get other kinds of products such as trellis, enclosures, filters and the like. Said semifinished product will have to be further submitted to other already known processes such as longitudinal and/or transverse stretching processes, in order to create a series of completely differentiated articles. As the product obtained from the process and the equipment described above does not involve any removal of scraps owing to the fact that only a deformation of the fiber flow of the plastic material gives rise to said holes, it is to be observed that during the above mentioned further working stages the srength characteristics of the structure of said product undergo a further raising with respect to the corresponding characteristics of products obtained from traditional processes. Thus, a series of very interesting and efficient applications can be achieved, above all in the field of enclosures.

Furthermore, as the product so obtained can be submitted to high stresses in every direction, it is much easier to get any kind of articles resulting from the semifinished product obtained from the process of this invention. Obviously, the process and equipment of the present invention are susceptible of a number of modifications and changes without departing from the scope and spirit of the invention itself, as defined in the appended claims.

What is claimed is:

1. A process of manufacturing a plastic plate provided with holes, comprising the steps of
    effecting extrusion from an orifice of a plastic containing a multiplicity of fibers, said plastic being in a semifluid condition,
    biaxially expanding said plastic after said extrusion in a zone of expansion downstream of said orifice, bringing a plurality of perforating devices into contact with said plastic as expanded in said expansion zone at locations each of which is sufficiently spaced apart from said orifice that said fibers are separated without being cut, thereby forming a plurality of perforations in said plastic,
    further expanding said perforated plastic, and immersing said expanded plastic in a coolant.

2. Apparatus for manufacturing a plastic plate provided with holes, comprising an extruder head having an orifice for extruding plastic containing a multiplicity of fibers, said plastic being in a semifluid condition, mandrel means mounted in spaced-apart relation to said extruder head for biaxially expanding said extruded plastic in a zone of expansion downstream of said orifice, a plurality of perforating devices periodically movable into contact with said plastic as expanded at a plurality of locations between said extruder head and said mandrel means, each location being sufficiently spaced apart from said orifice that said fibers are separated without being cut, thereby forming a plurality of perforations in said plastic, said mandrel means facilitating further expansion of said plastic after the formation of said perforations, and means for cooling said perforated and expanded plastic.

3. Apparatus according to claim 2 wherein said extruder head is formed with an extrusion orifice that is circular in cross section, said mandrel means is circular in cross section, said extrusion orifice and said mandrel means are mounted coaxially with respect to each other, and the cross section of said mandrel means being larger than the cross section of said orifice.

4. Apparatus according to claim 2 wherein said perforating devices have a direction of movement within the range of (a) vertical to (b) perpendicular to the surface of said plastic.

5. Apparatus according to claim 2 or 3 wherein said perforating devices are disposed in a circle around said plastic.

6. Apparatus according to claim 5 wherein said perforating devices further have a circular direction of movement around said plastic, said movement around said plastic being within the range of (a) continuous movement to stepped movement.

* * * * *